Aug. 7, 1928.　　　　E. J. SWEETLAND　　　　1,680,029
FILTER
Filed Jan. 10, 1922　　　3 Sheets-Sheet 1
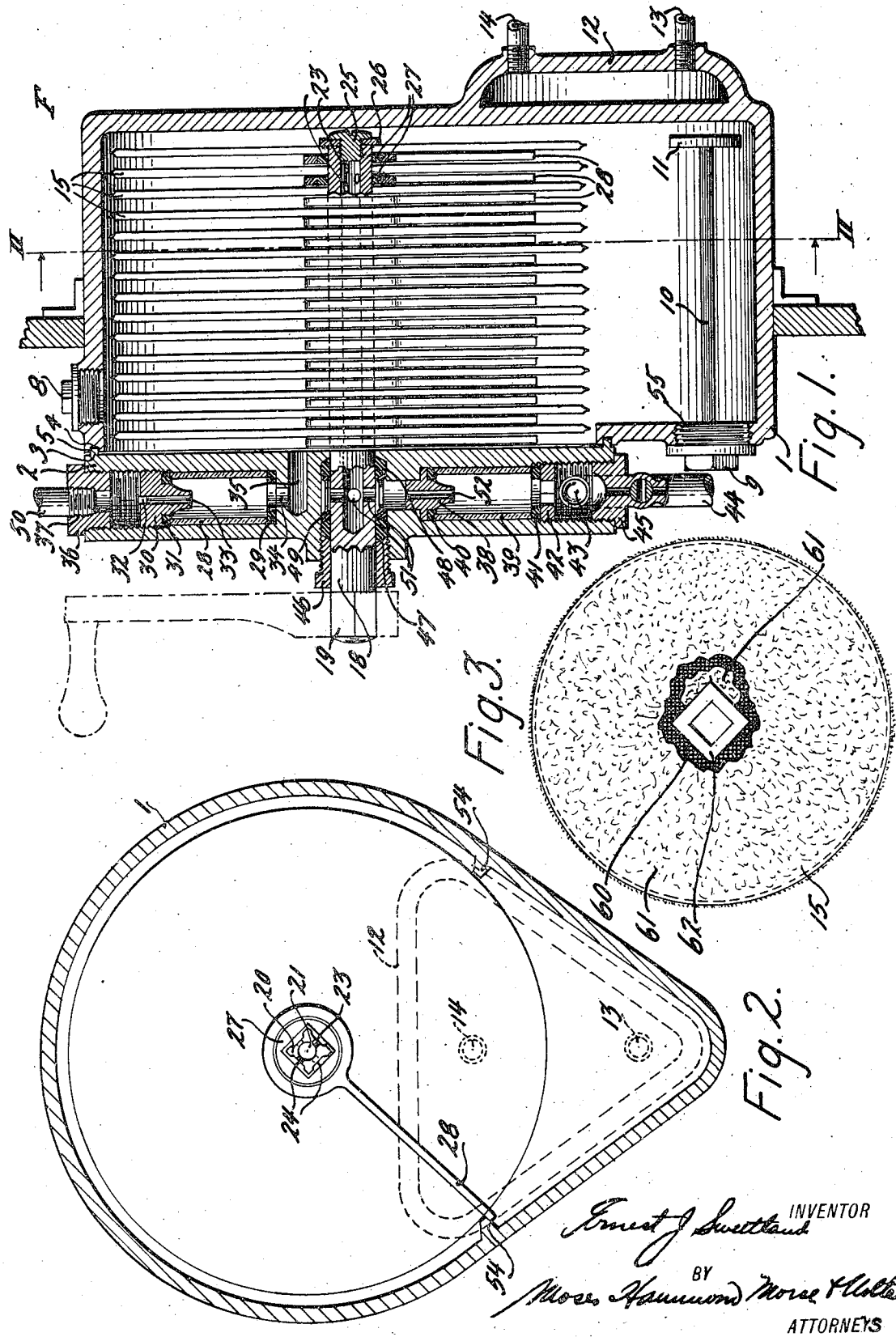

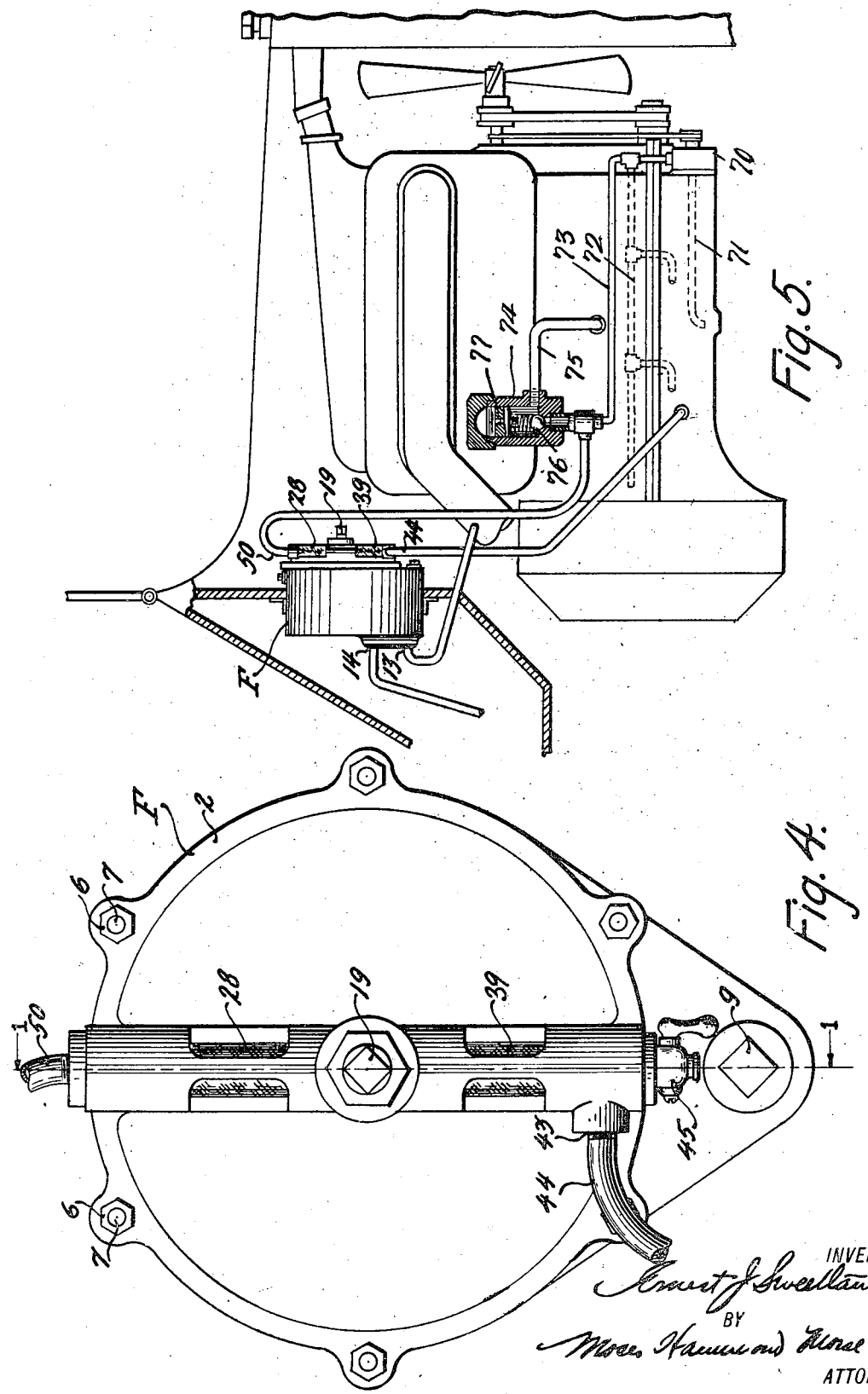

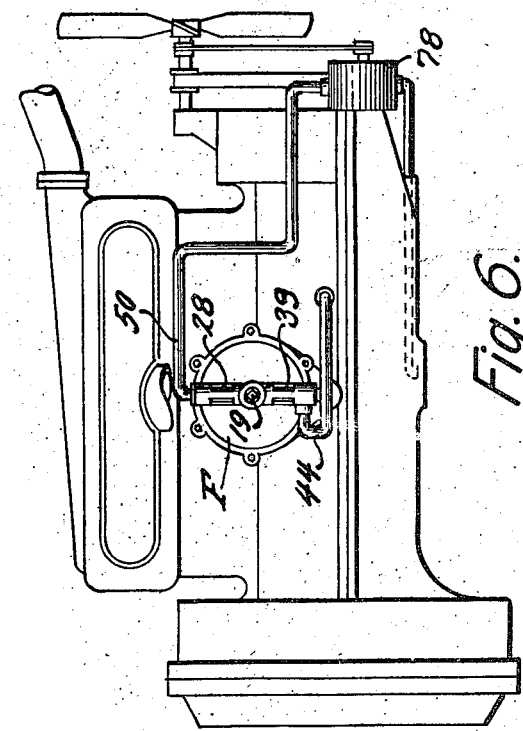
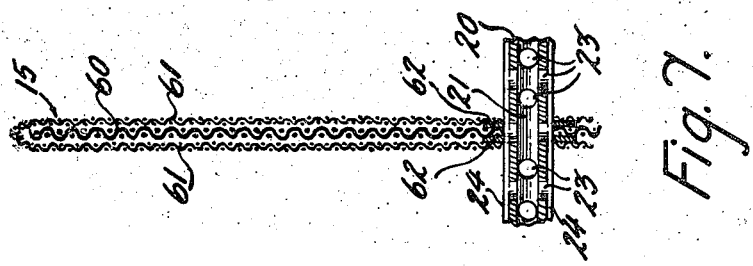

Patented Aug. 7, 1928.

1,680,029

UNITED STATES PATENT OFFICE.

ERNEST J. SWEETLAND, OF HAZLETON, PENNSYLVANIA.

FILTER.

Application filed January 10, 1922. Serial No. 528,355.

Among the objects of my invention are to provide a new and improved form of filter casing adapted to receive the filter elements in its upper portion while its lower portion forms a receptacle for the solids that might be removed from the filter leaves and which acts as a settling chamber for water which might find its way into the oil circulatory system, either due to condensation or leakage from the water jackets, and which chamber also traps a certain amount of impurities by sedimentation.

A further object of the invention is to provide means for cleaning the settling chamber or compartment in a convenient manner.

Another object of the invention is to provide readily operable means for removing the carbon laden slime from the surfaces of each of the filter elements, so that the same will be discharged by gravity into the settling chamber, from whence it is removed by the afore-mentioned removing means.

Another novel feature of the invention resides in the arrangement of the oil inlet to the filter casing and the oil outlet therefrom, the associated passageways being so arranged that when the filter is mounted at a point above the oil level in the crank case, filtration will be continued by gravity after the automotive engine ceases to operate, thus increasing the capacity of the filter.

A still further object of the invention is to provide means for readily admitting to the casing a filter dressing with which the filter elements will become coated as soon as the filter begins to function.

Other objects of the invention will manifest themselves upon a reading of the following specification from which a good understanding of the invention may now be had. Several specific forms of embodiment thereof being illustrated in the accompanying drawings, to which reference is directed and in which Figure 1 is a view showing one form of embodiment of the filter in vertical section, the plane of the section being indicated by the line 1—1 in Figure 4;

Figure 2 is a section of Figure 1, taken on lines II—II looking in the direction of the arrows;

Figure 3 is a view showing one of the filter elements in elevation;

Figure 4 is a front elevation of the filter;

Figure 5 is a view showing the filter installed on the internal combustion engine of a vehicle, Figure 6 is a view showing a modified form of installation, and Figure 7 is a detail view on a larger scale showing a section of one of the filter leaves mounted on the filter leaf shaft.

Similar characters of reference designate similar parts in each of the several views.

The filter is indicated by the reference character F and comprises a casing 1 which is preferably of cast iron or aluminum, having such shape as to provide a cylindrical upper portion for receiving the filter elements 15, and a substantially triangular lower portion or settling chamber as indicated in Figure 2. The front of the casing is provided with a circular opening which is covered by a plate 2 having a lip 3 for cooperating with a circular groove 5 about the opening. A gasket 4 is provided in the groove to render the junction tight. A number of nuts 6 (Figure 4) cooperate with studs 7 in casing 1 for securing the cover on the casing.

At the upper edge of the casing there is provided a plug 8 which may be removed for filling the casing with a liquid, herein termed "a filter dressing" and at the lower part of the casing is provided a plug 9 which may be used for draining the casing or removing accumulated precipitate or water therefrom. A shaft 10 provided with a disc 11 is fixed to the inner end of the plug to facilitate the cleansing.

The filter leaves or elements 15 are mounted on a drainage shaft 18, the exterior surface of which is square in cross section, as indicated in Figure 2. The leaves 15 are each composed of a coarse mesh wire drainage screen 60 which is covered with any suitable filter fabric 61. This fabric may be either metallic such as fine wire gauze or it may be non-metallic such as cotton, linen, woolens, silk or asbestos cloth. In the present form of the filter I prefer the use of a cotton fabric, which has considerable strength, such as cotton drill cloth or canton flannel. Under certain conditions the fuzzy surface of this flannel is very advantageous, particularly when the filter leaves are coated with a supplementary filter bed, as for example, with a layer of kieselguhr, as is hereinafter described. In such case, the nap of the fabric serves to retain the said layer in place so that there is no tendency for the same to slough off when the filter remains unused for a considerable period of time. Metallic plates 62 are provided at the center of screen 60, the purpose of these plates being to prevent the filter fabric from being forced into the meshes of the drainage screen 60 by pressure when the leaves are assembled on the shaft, so that a restriction in the flow of the filtered oil through the central opening is avoided.

The filter elements are spaced on the shaft by a series of spacing washers 27 (Figure 2). Each face of the shaft is provided with a groove 24 for conducting the filtered oil from the central openings of the filter leaves, to a series of holes 23, through which it passes to the circular drainage opening 21 in the shaft. A plurality of scrapers 28 are mounted between the adjacent filter elements by means of rings which loosely encircle the spacing washers 27. The manner in which these scrapers are operated will be described hereinafter.

The rear end of the shaft is provided with a screw 25 which cooperates with a washer 26 for holding the filter elements in place. The forward end of the shaft is rounded to permit it to rotate within a stuffing box composed of a packing gland 46 and packing rings 47 and 48, which are held in spaced relation by a perforated metallic spacing ring 49. A plurality of holes 51 are provided in the shaft for permitting the filtered oil to escape from the interior of the shaft, and the perforated spacing ring together with the packing gland serves to keep both packings tight so that leakage of both the filtered and unfiltered oil is prevented. The outer end 19 of the shaft is squared to permit of the application of a crank or wrench for turning the shaft during the operation of cleaning the filter, as will hereinafter be described.

The cover plate is cast with an integral boss extending vertically across the plate. The upper portion of this boss is bored out to receive the gage glass 28 which rests against a cork gasket 29 at its lower extremity, and is held in place at its upper end by the nut 30 and cork gasket 31. The nut 30 is provided with a screw driver slot 32 and a passageway 33 which communicates with the interior of the filter casing by means of the passageways 34 and 35. The passageway 33 is of a restricted nature and applies resistance to the oil as it is fed to the filter, thus maintaining a pressure on the feed line and possibly, in some cases, preventing the excess oil being fed thereto, which might interfere with the proper feeding of the oil to the parts to be lubricated.

An inlet pipe 50 is secured to the upper end of the boss by means of a nut 36 having a tapped opening 37. The oil which is to be filtered passes from pipe 50 through the sight glass 28 and passage 35 into the filter casing, where it is free to circulate between the filter leaves.

The outlet for the filtered oil comprises the openings 51 in the drainage shaft, the nozzle 38 and the gage glass 39, this gage glass being held between packing washers 40 and 41, all of these parts being secured in place by the nut 42, having a square central opening to facilitate removal. An outlet opening 43 is provided in the side of the boss and an outlet pipe 44 is in threaded connection with this opening. A sample cock 45 is screwed into the lowermost end of the boss for convenience in taking samples of the filtered oil.

For the purpose of heating the oil which is to be filtered, there is provided on casing 1 a jacket 12 having inlet and outlet pipes 13 and 14, which are connected with the exhaust gas or hot water system of the engine with which the filter is associated. The inlet pipe 50 of the filter is constantly supplied with turbid lubricating oil under pressure and the outlet pipe 44 leads to a reservoir in the oiling system of the engine, as is described more particularly hereinbelow.

The method of operation of the filter is as follows: The filter casing is first filled with the filter dressing hereinbefore referred to, this dressing consisting preferably of pulverized kieselguhr mixed with oil in any desired proportion preferably about 50 grammes per quart of oil. This mixture is thoroughly rubbed together to eliminate all lumps and make a smooth flowing mixture. This dressing is introduced into the filter casing through the opening provided by the plug 8. The oil which is to be filtered is then caused to pass through pipe 50 into the casing, a pressure of from 5 lbs. to 10 lbs. per square inch being maintained on the feed line, as will be described hereinafter. The clear oil mixed with the kieselguhr is thus displaced by the turbid crank case oil and caused to filter through the leaves into shaft 18, passing from this shaft through sight glass 39 to the outlet pipe 44. The kieselguhr mixed with the oil is deposited during this process as a thin, even layer on the surface of the filter cloth 61, thus constituting a supplementary filter bed of extreme fineness. After the dressing has thus been displaced from the casing, the impure oil begins to pass through the filter elements coated with the bed of kieselguhr. The fineness of this bed is so extraordinary that it retains all visible particles of carbon sediment or other impurities however minute.

Although in the present instance this bed is described as being composed of kieselguhr, it will be understood that other powdered and preferably flocculent substances may be employed, such substances being, for example fuller's earth, pulverized charcoal, pulverized bone char, carbonate of lime, asbestos, wood pulp, clay and the like. Some of these substances, it will be noted, have decolorizing properties. Because of the fact that oil used for a long time has the tendency to become slightly acid and therefore, corrosive, an alkaline substance, such as hydrate, oxide or carbonate of lime may be incorporated in the supplementary filter bed for the purpose of neutralizing the acidity of the oil.

As the filtration of the oil continues, a slime bed of finely divided carbon, road dust and other foreign matter is accumulated on the filter surface so that the resistance to filtration gradually increases until after a period of time, say several months, the rate of flow through the filter elements is greatly reduced. The filter may then be cleaned in the following manner: The feed of oil through pipe 50 is stopped. The drain plug 9 is then removed and the contents of the casing is allowed to drain into any convenient receptacle. A crank is now applied to the square end 19 of the filter shaft and the same is turned through, say, 12 or 15 revolutions. The scrapers 28 rotate with the filter elements through a small angle when their further rotation is stopped by lugs 54 (Figure 2) provided in the wall of the casing. The continued rotation of the leaves causes the scrapers to disengage the bed of kieselguhr and slime deposited on their outer surfaces and causes this deposit to fall into the space below the filter elements. This space may be thoroughly cleaned out by the use of the scraping disc 11. After the filter has thus been thoroughly cleaned the casing is again filled with dressing through plug 8 so that a new filter bed of kieselguhr is deposited on the filter leaves. The operation of the filter may then be continued until a renewed cleansing is found necessary.

One of the important advantages of the present construction of the filter lies in the fact that, because of the two sight glasses, the turbid crank case oil may be observed at any time entering the filter and the clear oil leaving the filter, so that the operation thereof may be discerned at a glance. Another advantage consists in the provision of the settling chamber below the filter element, in which chamber the heavier solid particles as well as any water which may be in the oil will accumulate. Moreover, because of the vertical position of the filter elements, the solids which are deposited thereon, will settle into the settling chamber at such time as when the filter is not in operation. The filter surfaces are thus relieved to a certain extent of carrying an excessive load of slime so that a rapid impairment of the filtering efficiency is avoided. The shaft of the filter may advantageously be given a turn or two from time to time so that the heavier impurities are removed without necessitating a thorough cleansing operation. The settling space below the filter elements thus constitutes a valuable storage chamber for the water and the accumulated solids where they remain out of harm to the engine and from which they may be removed when a thorough cleansing is to be effected.

The particular manner in which the filter is preferably connected with the oil circulating system of an internal combustion engine is illustrated in Figure 5, in which the filter F is shown mounted on the dash board of an automobile, the face of the instrument being forward so that the sight glasses may conveniently be inspected by the operator. A pump 70 which may be of any suitable type, is mounted upon the engine casing and is provided with an intake pipe 71 and outflow pipes 72 and 73. The intake pipe extends to the lowermost portion of the crank case of the engine and the outflow pipe 72 communicates with suitable ducts for leading the oil to the bearings or any other parts of the engine lubrication of which is desired. It will be understood that this portion of the drawing is merely diagrammatic and serves only to illustrate the ordinary systems of force feed or splash lubrication of the engine parts. The pipe 73 is joined to the outflow pipe 72 and communicates with the intake pipe 50 of the filter. The outflow pipe 44 of the filter leads to the interior of the crank case. By virtue of the above connection, the oil pump 70 is continually forcing a part of the circulating oil to the filter, the remaining portion being directly returned to the bearings through pipe 72. As long as the engine is in operation, therefore, a continuous flow of oil through the filter is maintained and continuous cleansing of the oil is thus secured.

A relief valve 74 is provided on the inlet pipe of the filter. This valve communicates directly with the crankcase through a pipe 75. In the particular form of construction illustrated, it consists of a ball valve 76 normally maintained in closed position by a spring, the tension of which may be regulated by an adjustable member 77. The tension is such that the oil flowing into the filter will be under a working pressure not greater than a maximum sufficient to lubricate the engine parts and to overcome the back pressure offered to the flow of oil by the filter. Should the pressure rise above this maximum, due to any clogging in the oil circulating system or to the fact that the pump delivers more oil than can flow through the system, the ball valve will be forced from its seat, thus permitting some of the oil to by-pass the filter and flow directly into the crank case through the pipe 75. When the pressure returns to normal the spring returns the ball valve to its seat.

A modification of the method of mounting the filter is illustrated in Figure 6, where it is shown applied directly to the side of the engine, the inlet pipe 50 being in direct connection with the outflow pipe of an oil pump 78, the intake of which communicates with a depression in the bottom of the crank case. In this modification, the oil pump is not a part of the regular circulating oil system of the engine, but serves solely for the purpose of supplying the filter with oil under pressure. The outlet pipe 44 of the filter is connected directly to the interior of the crank case.

As heretofore observed, the filter surfaces of the filter elements are of such fineness that they not only intercept the minute particles of carbon and asphaltic sediment but also separate and remove any water that might be entrained in the circulating oil even though the same is in an emulsified condition, such water when removed will settle in the settling chamber below the filter elements and can be withdrawn when this chamber is cleaned.

The finely woven non-metallic fabric of the filter having such an extensive area within a small compass makes a very satisfactory filter for the purpose and I have found that it serves to produce a filter bed which is capable of arresting the very minute and finely divided particles of solid matter that are present in the used oil. Owing to the extensiveness in area of the filter surface, the filter device of my construction functions for a considerable period of time without necessitating cleaning. In fact, a filter constructed in the manner just described, has shown satisfactory results after hundreds of miles of running without becoming clogged to such an extent as to require cleaning.

It is, of course, understood that I do not limit my invention to the specific embodiments shown but that I intend to cover the same broadly in whatever form its principles may be employed.

Having thus described my invention, I claim—

1. A filter comprising a casing, a filter unit disposed in the upper part of said casing, said casing being provided with a settling chamber below said units for receiving the heavier impurities, a drain plug provided in the lower portion of said chamber and means connected with said drain plug to facilitate removal of said impurities when said drain plug is removed.

2. In a filter, a casing, a drainage shaft rotatably mounted in said casing, a plurality of filter leaves on said shaft, each leaf comprising a drainage member of coarse mesh, a filter fabric of finer mesh enveloping said drainage member, said leaf having a central drainage opening, and a plate disposed between said fabric and said drainage member adjacent said central opening for preventing said fabric from entering said member and obstructing the flow of liquid in the leaf toward said central opening.

3. A filter comprising a casing, a drainage shaft rotatably mounted therein, a plurality of filter elements mounted on said shaft, spacing members between said elements, a plurality of scrapers suspended loosely from said shaft between said elements, and means for preventing rotation of said scrapers in unison with said elements so as to bring about relative movement between said scrapers and said elements upon rotation of the shaft.

4. In a filter, a casing having an opening in the face thereof, a cover for said opening, a drainage shaft rotatably mounted on said cover, said shaft being normally stationary, a plurality of filter elements mounted on said shaft, means for rotating said shaft for the purpose of cleaning said filter elements, means supported by said shaft to scrape the impurities from said elements when said shaft is rotated and means for rotating said shaft.

5. In a filter, a casing having an opening in one face thereof, a cover for said opening, a drainage shaft rotatably mounted in said cover, a plurality of filter elements mounted in spaced relation on said shaft, a settling chamber at the bottom of said casing, a plurality of scrapers between said elements loosely and rotatably suspended from said shaft and means to stop said scrapers, when said shaft and elements are rotated in either direction, in position to discharge the impurities removed by said scrapers into said settling chamber.

6. In a filter, a casing having an opening in the face thereof, a cover for said opening, a drainage shaft rotatably mounted on said cover, said shaft being normally stationary, a plurality of filter elements mounted on said shaft, means supported by said shaft to scrape the impurities from said elements when said shaft is rotated, detachable means for rotating said shaft, and a storage chamber forming part of said casing in which the removed impurities are stored.

In testimony whereof I have affixed my signature to this specification.

ERNEST J. SWEETLAND.